(No Model.)
S. B. SABENS.
SEINE.
No. 311,377. Patented Jan. 27, 1885.
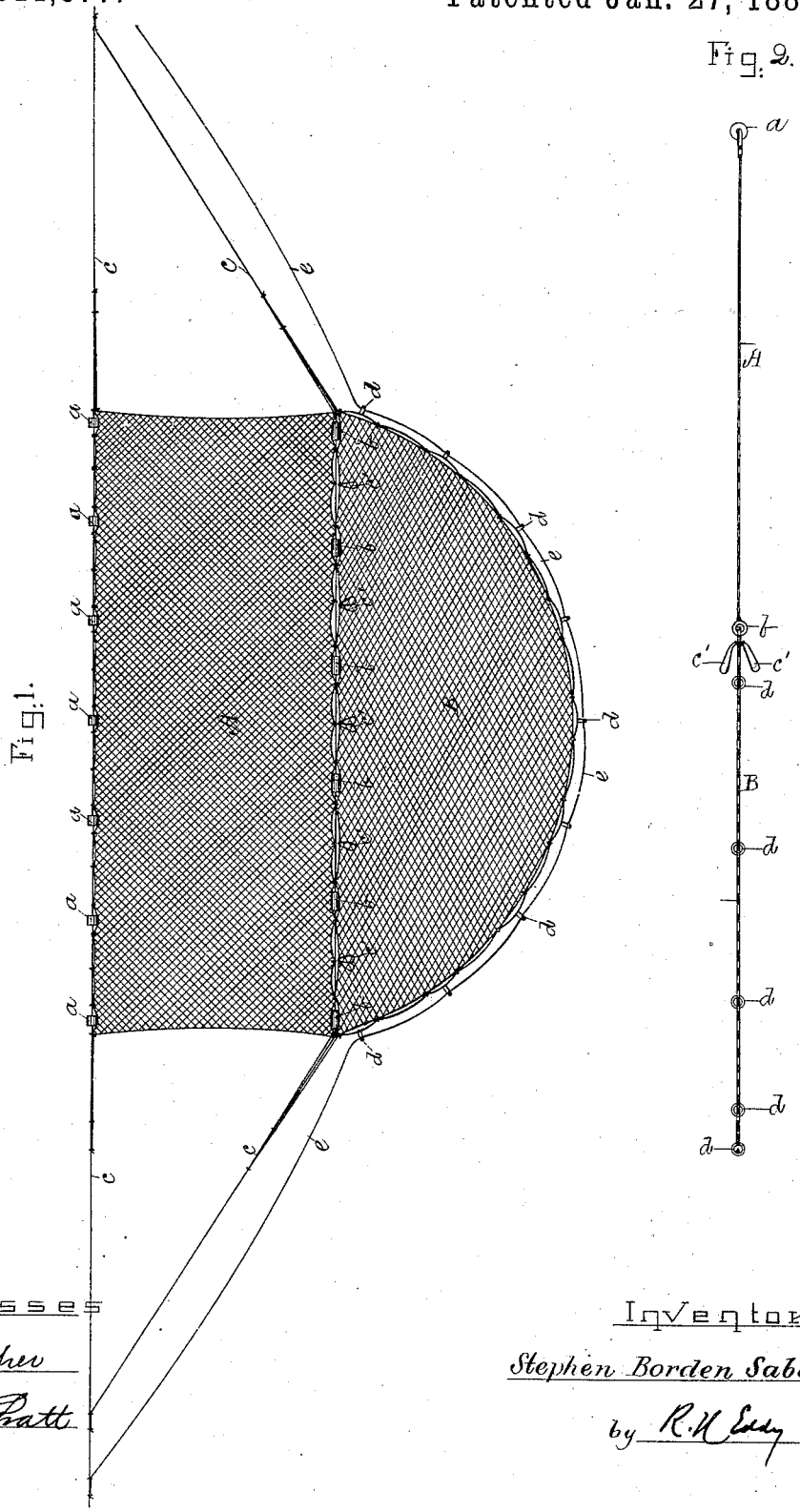
Witnesses
S N Piper
E P Pratt
Inventor
Stephen Borden Sabens.
by R. H. Eddy atty.

UNITED STATES PATENT OFFICE.

STEPHEN BORDEN SABENS, OF NEW BEDFORD, MASSACHUSETTS.

SEINE.

SPECIFICATION forming part of Letters Patent No. 311,377, dated January 27, 1885.

Application filed June 17, 1884. (No model.)

*To all whom it may concern:*

Be it known that I, STEPHEN BORDEN SABENS, of New Bedford, in the county of Bristol, of the Commonwealth of Massachusetts, have invented a new and useful Improvement in Seines for Capturing Fish; and I do hereby declare the same to be described in the following specification, and represented in the accompanying drawings, of which—

Figure 1 is a front view, and Fig. 2 a transverse section, of a seine containing my invention, the nature of which is defined in the claims hereinafter presented.

The seine to which my improvement appertains is of the class that is usually provided with a netted projection or apron, of which examples are given in the United States Patents No. 120,974 and No. 194,434, such improvement being to enable the apron to be "pursed" to advantage.

In the drawings, A denotes a seine having a series of floats, *a*, adapted to its upper edge, a series of sinkers, *b*, fixed to it at its lower edge, and a set or sets of hauling-lines, *c*, fixed to its corners. Furthermore, there are projected from the lower edge of the seine proper, or from the upper edge of the apron, at suitable intervals apart, pairs of loops *c'*. The apron B, attached to or projecting from the seine at its lower edge, goes between the loops of each pair, so that one of the pair is on one side and the other on the other side of such apron, as shown in Fig. 2. From the outer edge or edges of the apron there projects a series of rings, *d*, arranged at or about at equal distances apart, and through them a pursing-rope, *e*, extends.

Preparatory to sinking the seine in the water the apron is gathered or folded together between the loops of the several pairs, after which one loop of each pair is pushed through its fellow loop and held therein by making a short loop in the pursing-line and passing such short loop through the said fellow loop, so as to prevent the latter from being drawn back out of its fellow. On each pair of loops being so treated, it will be seen that on pulling the pursing-line by either or both its ends it may be drawn out of all the loops into which it was looped and still remain in the rings. On further pulling on the line the apron may be pursed or drawn together, so as to constitute a bag-like bottom to the seine on the latter being drawn around a shoal of fish, the apron so pursed serving to prevent the escape of the fish downward underneath the bottom of the seine.

The seine may be in one piece with the apron, in which case the pairs of loops are to be arranged at the lower part of the seine or the upper part of the apron.

I do not herein claim a seine provided with a netted projection or pursing-apron and with main and branch pursing-lines, as represented in the aforesaid patents.

I claim—

1. A seine having at its lower edge a series of loops arranged in pairs, with the two of each pair close together, in combination with a pursing-apron attached to the seine and extending at its upper edge between the loops of each pair, and provided at its lower or outer edge with rings, and a pursing-line going through such rings, all being substantially and for use as set forth.

2. The combination of a seine and a series of loops projecting from its lower edges and arranged in pairs, with intervals or spaces between the pairs, with a pursing-apron extending at its upper edge between the loops of each pair, all being substantially as set forth.

STEPHEN BORDEN SABENS.

Witnesses:
R. H. EDDY,
S. N. PIPER.